United States Patent
Su

(10) Patent No.: US 11,322,013 B2
(45) Date of Patent: May 3, 2022

(54) MONITORING METHOD OF MES, MONITORING DEVICE, AND READABLE STORAGE MEDIUM

(71) Applicant: SHENZHEN CHINA STAR OPTOELECTRONICS SEMICONDUCTOR DISPLAY TECHNOLOGY CO., LTD., Guangdong (CN)

(72) Inventor: Junlong Su, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 243 days.

(21) Appl. No.: 16/622,575

(22) PCT Filed: Dec. 4, 2019

(86) PCT No.: PCT/CN2019/122859
§ 371 (c)(1),
(2) Date: Dec. 13, 2019

(87) PCT Pub. No.: WO2021/097919
PCT Pub. Date: May 27, 2021

(65) Prior Publication Data
US 2021/0335118 A1 Oct. 28, 2021

(30) Foreign Application Priority Data
Nov. 20, 2019 (CN) .......................... 201911141707.3

(51) Int. Cl.
*G06F 17/00* (2019.01)
*G08B 21/18* (2006.01)
(Continued)

(52) U.S. Cl.
CPC ......... *G08B 21/187* (2013.01); *G06F 16/245* (2019.01); *G06F 16/248* (2019.01);
(Continued)

(58) Field of Classification Search
CPC .................................................. G08B 21/187
(Continued)

(56) References Cited

U.S. PATENT DOCUMENTS 8,491,839 B2 * 7/2013 Popp ...................... G06Q 10/06
422/67
9,958,860 B2 * 5/2018 Rischar .............. G05B 19/4185
(Continued)

FOREIGN PATENT DOCUMENTS

CN 101854270 A 10/2010
CN 104461820 A 3/2015
(Continued)

*Primary Examiner* — Evral E Bodden
(74) *Attorney, Agent, or Firm* — Geoffrey Lottenberg; Berger Singerman LLP

(57) ABSTRACT

A monitoring method of a manufacturing execution system (MES), a monitoring device, and a readable storage medium are provided. The monitoring method of the MES includes: reading log files of applications of an MES distributed on multiple servers and monitoring business operation information of the MES according to the log files. Based on this, this can make up for a gap in MES service monitoring and timely respond to abnormal production conditions. In addition, operators do not need to perform log query on each server.

14 Claims, 5 Drawing Sheets

(51) Int. Cl.
*G06F 16/245* (2019.01)
*G06F 16/248* (2019.01)
*G06Q 20/38* (2012.01)

(52) U.S. Cl.
CPC .......... *G06Q 20/389* (2013.01); *Y02P 90/02* (2015.11); *Y02P 90/80* (2015.11)

(58) Field of Classification Search
USPC .......................................................... 700/95
See application file for complete search history.

(56) References Cited

U.S. PATENT DOCUMENTS

| | | | |
|---|---|---|---|
| 10,810,535 B2* | 10/2020 | Engel | H04N 7/181 |
| 2008/0071405 A1 | 3/2008 | Liu et al. | |
| 2011/0167469 A1* | 7/2011 | Letca | H04L 67/10 |
| | | | 726/1 |
| 2012/0326859 A1* | 12/2012 | Sato | G06F 11/3072 |
| | | | 340/529 |
| 2016/0085734 A1 | 3/2016 | Piccazzo | |
| 2019/0033836 A1* | 1/2019 | Leuven | G05B 19/41865 |

FOREIGN PATENT DOCUMENTS

| | | | | |
|---|---|---|---|---|
| CN | 104915279 A | 9/2015 | | |
| CN | 104935621 A | 9/2015 | | |
| CN | 109739728 A | 5/2019 | | |
| WO | WO-0150209 A1 * | 7/2001 | ....... | G05B 19/41875 |

* cited by examiner

MONITORING METHOD OF MES, MONITORING DEVICE, AND READABLE STORAGE MEDIUM

CROSS-REFERENCE TO RELATED APPLICATIONS

This application is the National phase under 35 U.S.C. § 371 of International Application No. PCT/CN2019/122859, filed Dec. 4, 2019, which claims the benefit of and priority to Chinese Patent Application No. 201911141707.3, filed Nov. 20, 2019. The entire contents of these patent applications are hereby incorporated by reference herein.

FIELD OF INVENTION

The present disclosure relates to the field of display technologies, and more particularly to a monitoring method of a manufacturing execution system (MES), a monitoring device, and a readable storage medium.

BACKGROUND OF INVENTION

Manufacturing execution system (MES), as a production management system, plays an important role in undertaking workshop site control and upper-level enterprise operations. It actively collects and monitors production data in real time, manages production processes, ensures production quality, and effectively guides factory's production operations. However, there is currently no active and effective way to monitor a business status of MES, and its functions are lacking. This causes at least the following issues. First, response is not timely. When production is abnormal, an operator needs to report fault and an MES team knows that it has a lag and is not conducive to operation and maintenance. Second, data traffic is unknown. If an external system is connected to the MES, if there is a burst of message output in an environment, that is, the burst of message (MSG) will cause data blockage and affect efficiency of MES processing transactions. Third, an analysis of log files (LOG) is inefficient. The MES has applications (APs), running on multiple servers. The AP on each server can be regarded as running a business. A current search of contents of the log files needs to be performed on each server, which is time-consuming and labor-intensive and inefficient.

The prior art lacks monitoring of the business status of the MES itself.

SUMMARY OF INVENTION

An embodiment of the present invention provides a monitoring method of a manufacturing execution system (MES), comprising: reading log files of applications of an MES distributed on multiple servers; and monitoring business operation information of the MES according to the log files.

An embodiment of the present invention provides a monitoring device of a manufacturing execution system (MES), comprising: a reading module configured to read log files of applications of an MES distributed on multiple servers; and a monitoring module configured to monitor business operation information of the MES according to the log files.

An embodiment of the present invention provides a readable storage medium, wherein instructions are stored, and the instructions are adapted to be loaded by a processor to perform following steps: reading log files of applications of an MES distributed on multiple servers; and monitoring business operation information of the MES according to the log files.

Beneficial effects of the present application are that an embodiment of the present application can read the log files of MES applications distributed on multiple servers and monitor the MES business operation information according to the log files, which can make up for a gap in MES business monitoring and timely understand a health status of MES business, and respond to production anomalies in a timely manner, so that operations and maintenance operators can take the initiative to respond in a timely manner, and change from passive to active. In addition, operators do not need to perform log query on each server, which can improve operation and maintenance efficiency of MES.

DETAILED DESCRIPTION OF PREFERRED EMBODIMENTS

The technical solutions in the embodiments of the present application will be clearly and completely described below with reference to the accompanying drawings. Obviously, the described embodiments are only a part of the embodiments of the present application, but not all the embodiments. Based on the embodiments in the present application, all other embodiments obtained by those skilled in the art without creative efforts fall into the protection scope of the present application. Without conflict, the following embodiments and their technical features can be combined with each other.

Figure 1:
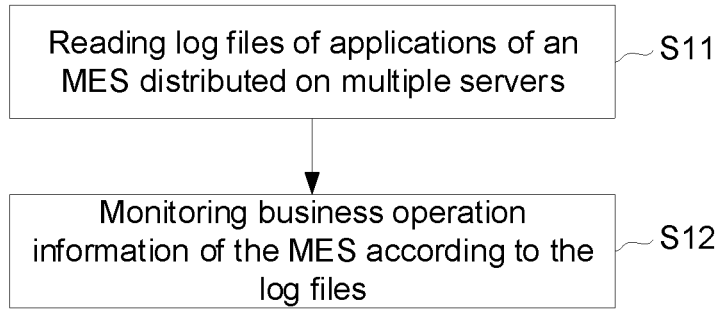
FIG. 1 is a schematic flowchart of a monitoring method of an MES according to an embodiment of the present application.

FIG. 1 is a schematic flowchart of a monitoring method of an MES according to an embodiment of the present application. Referring to FIG. 1, the monitoring method of the MES includes the following steps.

S11, reading log files of applications of an MES distributed on multiple servers.

S12, monitoring business operation information of the MES according to the log files.

The business of MES is distributed on multiple servers, and is realized by the application running on each server. The application on each server can be considered as a business assigned by MES. The log file generated by the application on each server is a log file or collection of files used to record its running related business, which can be divided into event logs and message logs, which can be used to process historical data, track diagnostic problems, and understand system activities.

An embodiment of the present application is equivalent to adding a function for monitoring the running status of the service to the MES. In a real application scenario, the implementation of the function includes, but is not limited to, a script or an application is preprogrammed and installed in the operating system of the MES. Therefore, an option such as "monitor business running status" is added to the MES setting interface. Then, the user can turn the function on or off by turning the option on or off.

That is to say, in an embodiment of the present application, computer software can be used to monitor the running status of the MES itself in real time. This fills in the gap in MES business monitoring and keeps abreast of the health status of MES business. This responds to production anomalies in a timely manner, which is convenient for operators and other operators to take the initiative to respond in a timely manner and turn from passive to proactive. In addition, operators do not need to query the log file content on each server, which is beneficial to improving the operation and maintenance efficiency of MES.

Figure 2:
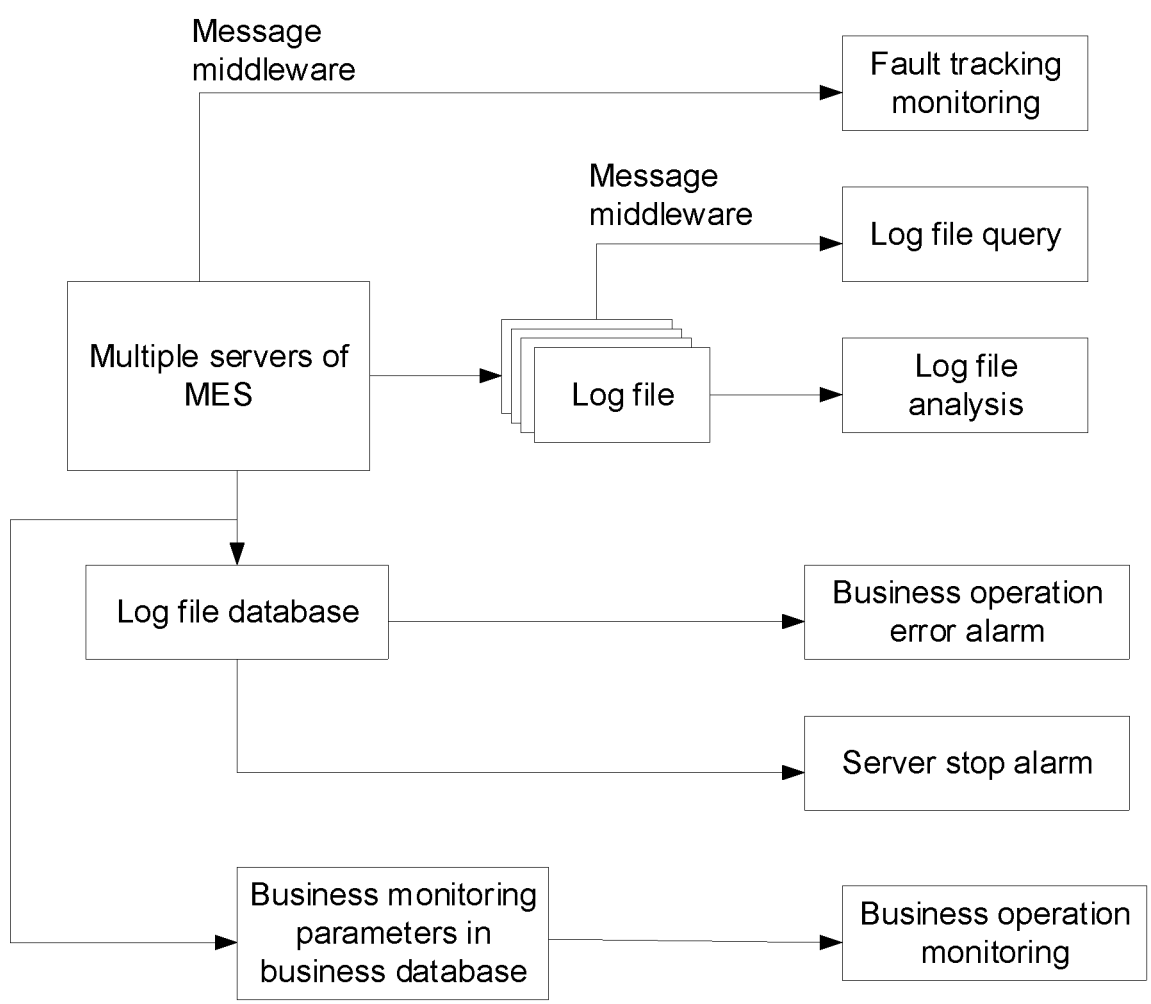
FIG. 2 is a schematic diagram of scene interaction of monitoring an MES according to an embodiment of the present application.

Referring to FIG. 2, an embodiment of the present application monitors the business running status of the MES itself, which can not only facilitate the query of the log file, but also monitor at least four abnormal situations. This is described in detail below with reference to the following embodiments.

Figure 3:
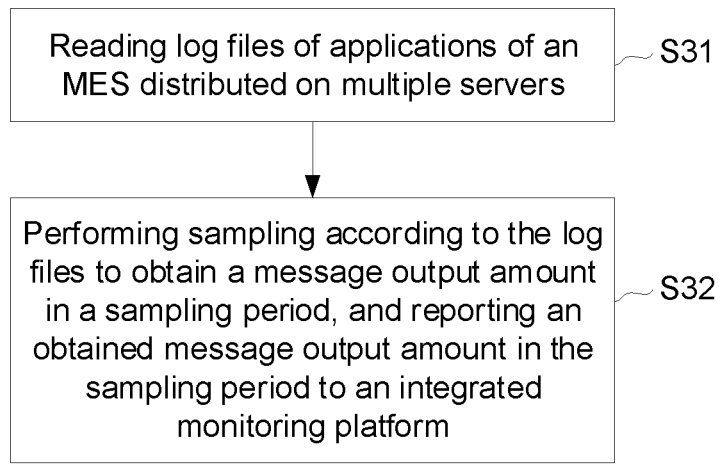
FIG. 3 is a schematic flowchart of an analysis method of an MES log file according to an embodiment of the present application.

FIG. 3 is a schematic flowchart of an analysis method of an MES log file according to an embodiment of the present application. As shown in FIG. 3, the analysis method of the MES log file includes the following steps.

S31, reading log files of applications of an MES distributed on multiple servers.

S32, performing sampling according to the log files to obtain a message output amount in a sampling period, and reporting an obtained message output amount in the sampling period to an integrated monitoring platform.

Step S32 can be regarded as the analysis of the log file in the business operation information of the MES. Specifically, the log files generated by each server are preliminarily gathered together, and the content of each log file is read in real time using software. Sampling is performed by statistical keywords. The keywords of the sampling may include characters that reflect the sampling period and the amount of message output. Then report the data to the front-end monitoring integration platform. Finally, a real-time diagram of the output of the message is presented. The abscissa of the graph may be time, and the ordinate may be a message output amount.

Therefore, this embodiment can monitor the message output of the MES in real time, timely detect and prevent MSG bursts, avoid data blockage, and ensure the efficiency of MES processing services.

Figure 4:
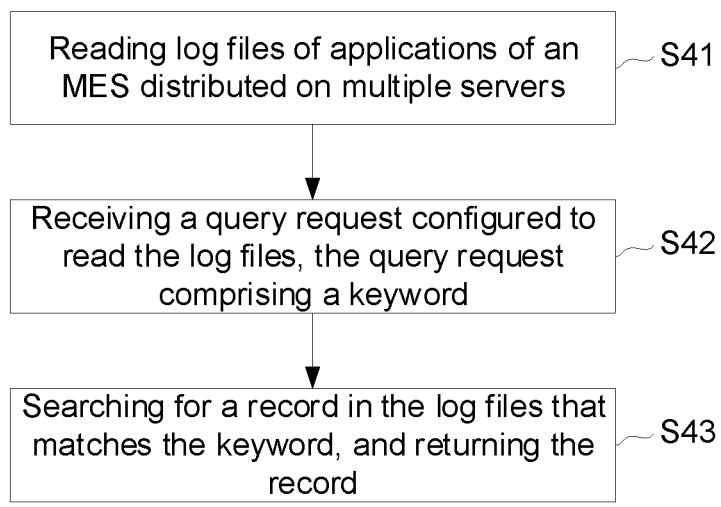
FIG. 4 is a schematic flowchart of a query method of an MES log file according to an embodiment of the present application.

FIG. 4 is a schematic flowchart of a query method of an MES log file according to an embodiment of the present application. As shown in FIG. 4, the query method of the MES log file includes the following steps.

S41, reading log files of applications of an MES distributed on multiple servers.

S42, receiving a query request configured to read the log files, the query request comprising a keyword.

S43, searching for a record in the log files that matches the keyword, and returning the record.

Steps S42 and S43 can be regarded as a log file query in the service operation information of the monitoring MES. Specifically, the log files generated by each server are grouped together, and the front end sends a query request to the background to read the log files generated by each server. Search the log records that meet the conditions (that is, match the keywords in the query request), and then transmit the results back to the front end through Tibco RV (message middleware used by MES) for analysis by relevant operators. Therefore, this embodiment can avoid the repeated and tedious work of manually searching log files on each server by the operator.

Figure 5:
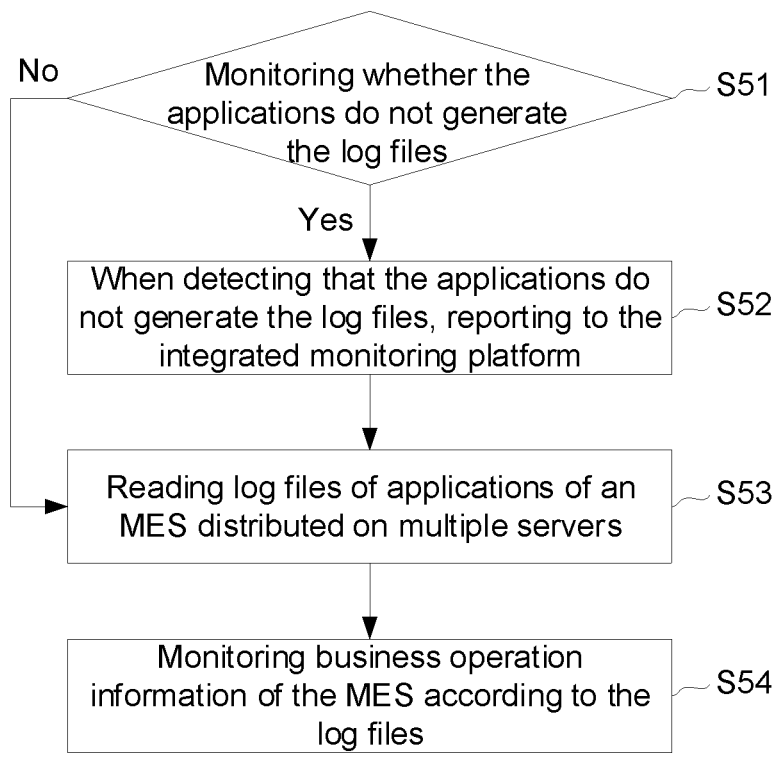
FIG. 5 is a schematic flowchart of a method of monitoring a first abnormal situation of an MES according to an embodiment of the present application.

FIG. 5 is a schematic flowchart of a method of monitoring a first abnormal situation of an MES according to an embodiment of the present application. As shown in FIG. 5, the monitoring method includes the following steps.

S51, monitoring whether the applications do not generate the log files.

When it is detected that no application exists and no log file is generated, step S53 is performed. When it is detected that there is no log file generated by the application, step S52 is performed.

S52, when detecting that the applications do not generate the log files, reporting to the integrated monitoring platform.

S53, reading log files of applications of an MES distributed on multiple servers.

S54, monitoring business operation information of the MES according to the log files.

Steps S51 and S52 can be regarded as fault tracking monitoring in monitoring the business operation information of the MES. Specifically, this embodiment monitors services with high attention and important services in real time. When the business is blocked and an exception occurs, the monitoring software throws an exception. At the same time, the abnormal content is reported to the monitoring integration platform through Tibco RV. This facilitates relevant operators to sense the abnormal status of the business in real time, and then take effective measures.

Figure 6:
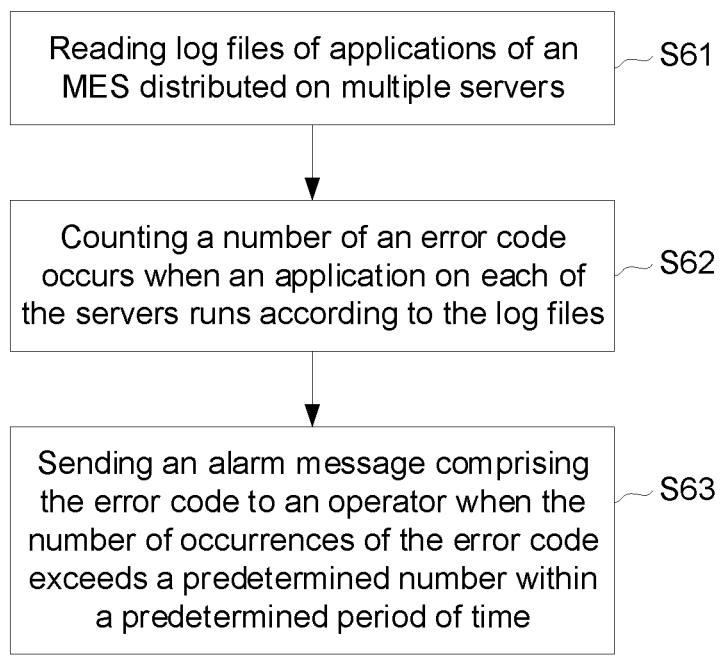
FIG. 6 is a schematic flowchart of a method of monitoring a second abnormal situation of an MES according to an embodiment of the present application.

FIG. 6 is a schematic flowchart of a method of monitoring a second abnormal situation of an MES according to an embodiment of the present application. As shown in FIG. 6, the monitoring method includes the following steps.

S61, reading log files of applications of an MES distributed on multiple servers.

S62, counting a number of an error code occurs when an application on each of the servers runs according to the log files.

S63, sending an alarm message comprising the error code to an operator when the number of occurrences of the error code exceeds a predetermined number within a predetermined period of time.

Steps S62 and S63 can be regarded as a service operation error alarm in the service operation information of the monitoring MES. Specifically, when an exception occurs in the business and the monitoring software throws an exception, the abnormal situation is collected and written to a log file database (the database stores all the information of the log files, and the data is also called MES DB AP Log) as a data source. The monitoring program periodically counts error codes. According to the preset monitoring rules, when the warning threshold is met, for example, when the number of occurrences of the error code exceeds a predetermined number of times in a predetermined period of time, the error code is sent to the relevant person for early warning of possible abnormalities. The error code is sent to the relevant person by including but not limited to email or WeChat.

Figure 7:
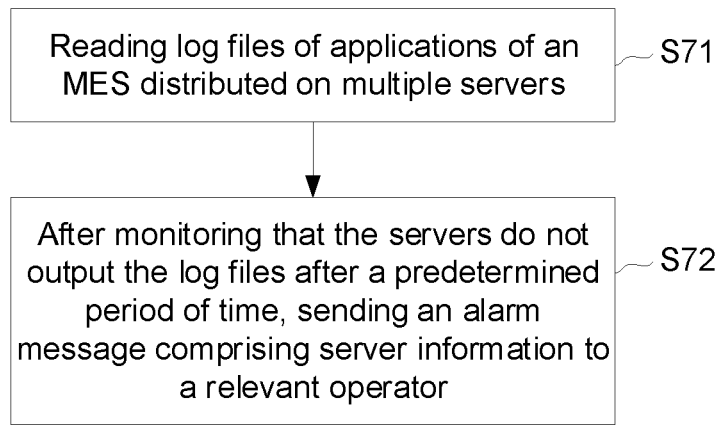
FIG. 7 is a schematic flowchart of a method of monitoring a third abnormal situation of an MES according to an embodiment of the present application.

FIG. 7 is a schematic flowchart of a method of monitoring a third abnormal situation of an MES according to an embodiment of the present application. As shown in FIG. 7, the monitoring method includes the following steps.

S71, reading log files of applications of an MES distributed on multiple servers.

S72, after monitoring that the servers do not output the log files after a predetermined period of time, sending an alarm message comprising server information to a relevant operator.

Step S72 can be regarded as a server stop alarm in the service operation information of the MES. There will be logging output when the server is working normally. Monitor the output of log records in real time. If there is no log output for a certain server for a certain period of time, it means that the server has been stopped. At this time, the monitoring software can remind related personnel to follow up the abnormal situation in time by sending an email or WeChat. The data in this step comes from a database that stores all log file information, and the data in it is also called MES DB AP Log.

Figure 8:
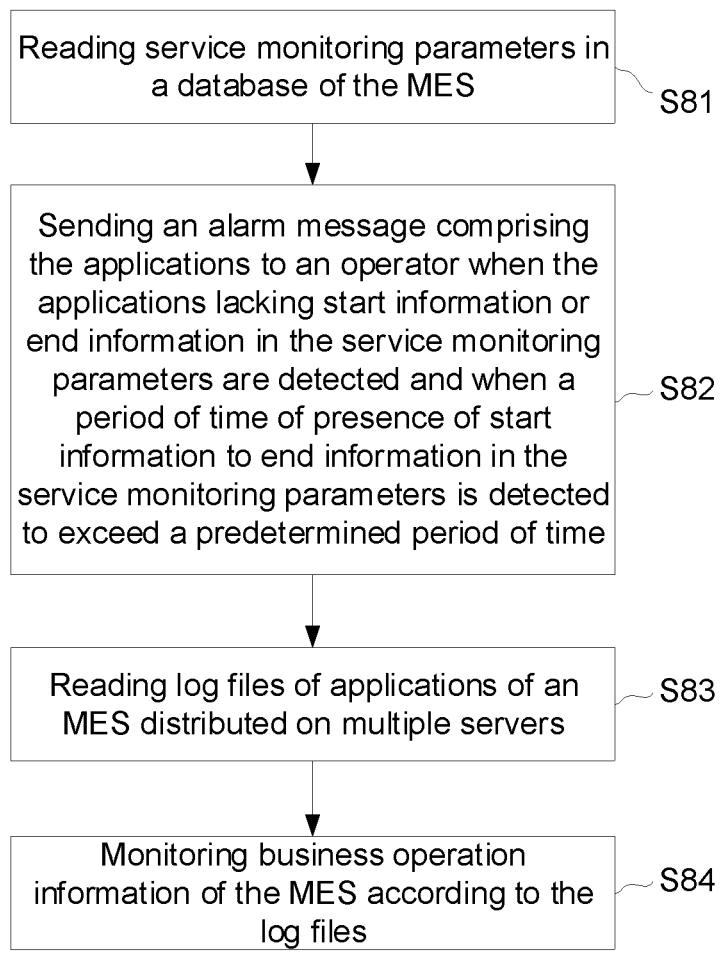
FIG. 8 is a schematic flowchart of a method of monitoring a fourth abnormal situation of an MES according to an embodiment of the present application.

FIG. 8 is a schematic flowchart of a method of monitoring a fourth abnormal situation of an MES according to an embodiment of the present application. As shown in FIG. 8, the monitoring method includes the following steps.

S81, reading service monitoring parameters in a database of the MES.

The MES database is also called the MES business database (MES DB), so the business monitoring parameters are also called MES DB transaction data.

S82, sending an alarm message comprising the applications to an operator when the applications lacking start information or end information in the service monitoring parameters are detected and when a period of time of presence of start information to end information in the service monitoring parameters is detected to exceed a predetermined period of time.

S83, reading log files of applications of an MES distributed on multiple servers.

S84, monitoring business operation information of the MES according to the log files.

Steps S81 and S82 can be regarded as service operation monitoring in the service operation information of the monitoring MES. Specifically, this embodiment collects the "start" and "end" records of various services to form a monitoring of the services. Combined with the "start-end" data group, it can monitor the business with "start" but not "end", and it can also monitor abnormal conditions such as business timeouts, so that maintenance personnel can timely understand the health status of the MES business.

Figure 9:
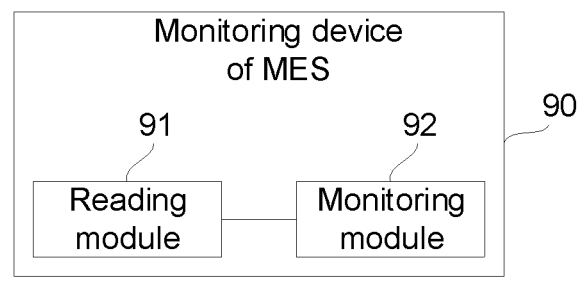
FIG. 9 is a schematic structural diagram of a monitoring device of an MES according to an embodiment of the present application.

FIG. 9 is a schematic structural diagram of a monitoring device of an MES according to an embodiment of the present application. As shown in FIG. 9, a monitoring device 90 of the MES includes a reading module 91 and a monitoring module 92. The reading module 91 is configured to read log files of applications of an MES distributed on multiple servers. The monitoring module 92 is configured to monitor business operation information of the MES according to the log files.

For the working principle and process of the reading module 91 and the monitoring module 92, reference may be made to the above-mentioned monitoring method of the MES, which will not be repeated here.

The monitoring device 90 of the MES in the embodiment of the present application can monitor the business operation status of the MES in real time, so as to make up for a gap in MES business monitoring and timely understand a health status of MES business, and respond to production anomalies in a timely manner, so that operations and maintenance operators can take the initiative to respond in a timely manner, and change from passive to active. In addition, operators do not need to perform log query on each server, which can improve operation and maintenance efficiency of MES.

It should be understood that the division of the above modules is a logical function division. There can be other divisions in actual implementation. For example, two modules can be integrated into another system, or some features can be ignored or not implemented. In addition, the modules can be connected to each other through some interfaces, and can also be electrical or other forms. The above modules may be implemented in the form of software function blocks or in the form of hardware.

Those of ordinary skill in the art can understand that all or part of the steps in the various methods of the above embodiments can be completed by instructions, or control related hardware by instructions. The instructions may be stored in a computer-readable storage medium, and loaded and executed by a processor. To this end, an embodiment of the present application provides a readable storage medium, where instructions are stored in the readable storage medium, and the instructions can be loaded by a processor to execute any type of MES provided by steps in a monitoring method in the embodiments of the present application.

Because of the instructions stored in the readable storage medium, the steps in any one of the MES monitoring methods provided in the embodiments of the present application can be executed. Therefore, the beneficial effects that can be achieved by any of the MES monitoring methods provided in the embodiments of the present application can be realized. For details, refer to the foregoing embodiments, and details are not described herein again.

Although the present application has been shown and described with respect to one or more implementations, those skilled in the art will recognize equivalent variations and modifications upon reading and understanding the present specification and drawings. This application includes all such modifications and alterations and is limited only by the scope of the following claims. In particular with regard to the various functions performed by the aforementioned components, the terminology used to describe such components is intended to correspond to any component (unless otherwise indicated) that performs the specified function of the component (e.g., it is functionally equivalent). Even if it is not structurally equivalent to the disclosed structure that performs the functions in the exemplary implementation of the present specification shown herein.

That is, the above are only examples of the present application, and thus do not limit the scope of the present application. Any equivalent structure or equivalent process transformation is made using the contents of the specification and drawings of this application. For example, the technical features of the embodiments are combined with each other, or they are directly or indirectly used in other related technical fields, and are similarly included in the protection scope of the present application.

In addition, in the description of the present application, it should be understood that the terms "center", "longitudinal", "transverse", "length", "width", "thickness", "upper", "lower", "front", "rear", "left", "right", "vertical", "horizontal", "top", "bottom", "inside", "outside", etc. of indicated orientation or positional relationship is based on the orientation or positional relationship shown in the drawings. This is only for the convenience of describing the application and simplifying the description, and does not indicate or imply that the device or element referred to must have a specific orientation, be constructed and operate in a specific orientation, and therefore cannot be understood as a limitation on this application. In addition, for structural elements with the same or similar characteristics, the same or different reference numerals may be used for identification in this application. In addition, the terms "first" and "second" are used for descriptive purposes only and cannot be understood as indicating or implying relative importance or implicitly indicating the number of technical features indicated. Therefore, the features defined as "first" and "second" may explicitly or implicitly include one or more features. In the description of the present application, the meaning of "a plurality" is two or more, unless it is specifically and specifically defined otherwise.

In this application, the word "exemplary" is used to mean "serving as an example, illustration, or illustration." Any embodiment described as "exemplary" in this application is not necessarily to be construed as preferred or advantageous over other embodiments. In order to enable any person skilled in the art to implement and use the present application, the above description is given in the present application. In the above description, various details are set forth for the purpose of explanation. It should be understood by those of ordinary skill in the art that the present application can be implemented without the use of these specific details. In other embodiments, well-known structures and processes will not be described in detail to avoid unnecessary details from obscuring the description of this application. Therefore, this application is not intended to be limited to the embodiments shown, but is to be accorded the widest scope consistent with the principles and features disclosed herein.

What is claimed is:

1. A monitoring method of a manufacturing execution system (MES), comprising:
   reading log files of applications of an MES distributed on multiple servers; and
   monitoring business operation information of the MES according to the log files;
   before reading the log files of the applications of the MES distributed on the multiple servers, the method comprises:
   obtaining service monitoring parameters in a database of the MES; and
   sending an alarm message comprising the application names to an operator when a period of time of presence of start information to end information in the service monitoring parameters is detected to exceed a predetermined period of time.

2. The monitoring method according to claim 1, wherein monitoring the business operation information of the MES according to the log files comprises:
   performing sampling according to the log files to obtain a message output amount in a sampling period, and reporting an obtained message output amount in the sampling period to an integrated monitoring platform.

3. The monitoring method according to claim 1, wherein monitoring the business operation information of the MES according to the log files comprises:
   receiving a query request configured to read the log files, the query request comprising a keyword; and
   searching for a record in the log files that matches the keyword, and returning the record.

4. The monitoring method according to claim 1, wherein before reading the log files of the applications of the MES distributed on the multiple servers, the method comprises:
   monitoring whether the applications do not generate the log files; and
   when detecting that the applications do not generate the log files, reporting, that the applications do not generate the log files, to the integrated monitoring platform.

5. The monitoring method according to claim 1, wherein monitoring the business operation information of the MES according to the log files comprises:
   counting a number of occurrences of an error code according to the log files when an application on each of the servers runs, wherein the log files store the number of occurrences of the error code; and
   sending an alarm message comprising the error code to an operator when the number of occurrences of the error code exceeds a predetermined number within a predetermined period of time.

6. The monitoring method according to claim 1, wherein monitoring the business operation information of the MES according to the log files comprises:
   after monitoring that the servers do not output the log files after a predetermined period of time, sending an alarm message comprising server information to a relevant operator.

7. The monitoring method according to claim 1, wherein before reading the log files of the applications of the MES distributed on the multiple servers, the method comprises:
   reading service monitoring parameters in a database of the MES; and
   sending an alarm message comprising the applications to an operator when the applications lacking start information or end information in the service monitoring parameters are detected.

8. A monitoring device of a manufacturing execution system (MES), comprising:
   a reading module configured to read log files of applications of an MES distributed on multiple servers; and
   a monitoring module configured to monitor business operation information of the MES according to the log files;
   before reading the log files of the applications of the MES distributed on the multiple servers, the method comprises:
   obtaining service monitoring parameters in a database of the MES; and
   sending an alarm message comprising the application names to an operator when a period of time of presence of start information to end information in the service monitoring parameters is detected to exceed a predetermined period of time.

9. The monitoring device of the MES according to claim 8, wherein monitoring the business operation information of the MES according to the log files comprises:
   performing sampling according to the log files to obtain a message output amount in a sampling period, and reporting an obtained message output amount in the sampling period to an integrated monitoring platform.

10. The monitoring device of the MES according to claim 8, wherein monitoring the business operation information of the MES according to the log files comprises:
- receiving a query request configured to read the log files, the query request comprising a keyword; and
- searching for a record in the log files that matches the keyword, and returning the record.

11. The monitoring device of the MES according to claim 8, wherein before reading the log files of the applications of the MES distributed on the multiple servers, the monitoring device of the MES comprises:
- monitoring whether the applications do not generate the log files; and
- when detecting that the applications do not generate the log files, reporting, that the applications do not generate the log files, to the integrated monitoring platform.

12. The monitoring device of the MES according to claim 8, wherein monitoring the business operation information of the MES according to the log files comprises:
- counting a number of occurrences of an error code according to the log files when an application on each of the servers runs, wherein the log files store the number of occurrences of the error code; and
- sending an alarm message comprising the error code to an operator when the number of occurrences of the error code exceeds a predetermined number within a predetermined period of time.

13. The monitoring device of the MES according to claim 8, wherein monitoring the business operation information of the MES according to the log files comprises:
- after monitoring that the servers do not output the log files after a predetermined period of time, sending an alarm message comprising server information to a relevant operator.

14. The monitoring device of the MES according to claim 8, wherein before reading the log files of the applications of the MES distributed on the multiple servers, the monitoring device of the MES comprises:
- reading service monitoring parameters in a database of the MES; and
- sending an alarm message comprising the applications to an operator when the applications lacking start information or end information in the service monitoring parameters are detected.

\* \* \* \* \*